(12) United States Patent
Todaro et al.

(10) Patent No.: US 10,146,509 B1
(45) Date of Patent: Dec. 4, 2018

(54) ASCII-SEEDED RANDOM NUMBER GENERATOR

(71) Applicants: Antonino Todaro, Milan (IT); Paolo Pedretti, Milan (IT)

(72) Inventors: Antonino Todaro, Milan (IT); Paolo Pedretti, Milan (IT)

(73) Assignee: MBDS, INC., Chicago, IL (US)

( * ) Notice: Subject to any disclaimer, the term of this patent is extended or adjusted under 35 U.S.C. 154(b) by 0 days.

(21) Appl. No.: 15/620,455

(22) Filed: Jun. 12, 2017

(30) Foreign Application Priority Data

May 10, 2017 (EP) .................................... 17425048

(51) Int. Cl.
  G06F 7/58    (2006.01)
  G06F 7/523   (2006.01)
  G06F 7/50    (2006.01)

(52) U.S. Cl.
  CPC ............... G06F 7/588 (2013.01); G06F 7/50 (2013.01); G06F 7/523 (2013.01); G06F 7/582 (2013.01)

(58) Field of Classification Search
  CPC ............................................. G06F 7/58–7/588
  USPC ................................................. 708/250–256
  See application file for complete search history.

(56) References Cited

U.S. PATENT DOCUMENTS

| | | | |
|---|---|---|---|
| 5,778,069 A * | 7/1998 | Thomlinson | G06F 7/582 380/262 |
| 6,044,363 A | 3/2000 | Mori | |
| 7,356,508 B2 | 4/2008 | Pellegrini | |
| 7,428,501 B2 | 9/2008 | Dinwoodie | |
| 7,610,217 B1 | 10/2009 | Mori | |
| 8,024,274 B2 | 9/2011 | Parkes | |
| 8,117,080 B1 | 2/2012 | Ban | |
| 8,234,276 B2 | 7/2012 | Skinner | |
| 9,248,369 B2 | 2/2016 | Fotevski | |
| 2001/0037239 A1 | 11/2001 | Kanatani | |
| 2002/0152130 A1 | 10/2002 | Salls | |
| 2007/0043629 A1 | 2/2007 | McHale | |
| 2007/0060320 A1 | 3/2007 | Kelly | |
| 2011/0225223 A1* | 9/2011 | Mitra | G06F 7/58 708/254 |
| 2012/0116856 A1 | 5/2012 | Eldad | |
| 2012/0220362 A1 | 8/2012 | Farah | |
| 2014/0187303 A1 | 7/2014 | Irwin, Jr. | |
| 2015/0332389 A1 | 11/2015 | Damen | |

(Continued)

Primary Examiner — Matthew D Sandifer
(74) Attorney, Agent, or Firm — Nixon Peabody LLP

(57) ABSTRACT

A method for assigning a random number to a user in a set of users includes computing a random number assignment seed value based on an ASCII-value representation of the user's name, dividing the random number assignment seed value by a quantity of unassigned numbers available to be assigned to the user to produce a modified random number assignment seed value, rounding the modified random number assignment seed value down to an integer, computing a random number offset value by multiplying the quantity of unassigned numbers by the rounded modified random number assignment seed value, subtracting the random number assignment offset value from the random number assignment seed value to determine a random number assignment lookup number, determining the random number to be assigned to the user based on the random number assignment lookup number, and assigning the determined random number to the user.

4 Claims, 11 Drawing Sheets

(56) References Cited

U.S. PATENT DOCUMENTS

2016/0162940 A1   6/2016  Kang
2016/0180653 A1   6/2016  Cooley

* cited by examiner

ASCII-SEEDED RANDOM NUMBER GENERATOR

CROSS-REFERENCE TO RELATED APPLICATION

This application claims the benefit of European Patent Application Serial No. 17425048.0, filed May 10, 2017, which is incorporated herein by reference in its entirety.

TECHNICAL FIELD

The present invention relates to random number generators. Specifically, the invention relates to methods of assigning random numbers to users in a set of users and selecting a user from the set of users based at least on the random numbers assigned to the user in the set of users.

BACKGROUND

Random number generators are used in a variety of different applications, such as games of chance, including electronic casino games and slot machines; statistical analysis and sampling methods such as the bootstrap method or Monte Carlo methods; computer simulations of physical phenomena such as neutron transport, population genetics, the behavior of sub-atomic particles, or the tossing of a coin; and a variety of cryptographic techniques.

However, many computer-implemented random number generators are not true random number generators, but are rather pseudo-random number generators (PRNG). PRNGs do not generate strings of numbers that are actually random. Rather, the numbers generated by a PRNG are generally based on one or more initial conditions or variables that are constant and unvarying for each random number generated. The numbers generated by a PRNG are not truly random, and will eventually begin to repeat if enough random numbers are generated. The length of the individual sequence of numbers depends on the constant initial conditions and variables.

Thus, improved random number generators are needed that utilize actual randomness and are based in part on actual non-deterministic properties, phenomena, or events that are continuously changing for each random number that is generated. These improved random number generators thus increase the degree of randomness in any computer-implemented application for which random numbers are needed, which can increases the accuracy and authenticity of the application. Also needed are improved procedures to utilize these improved random number generators.

SUMMARY

Aspects of the present disclosure include a computer-implemented method for assigning a random number from a set of numbers to one user in a set of users. The method comprises computing a random number assignment seed value that is specific to the one user in the set of users based at least on an ASCII-value representation of a name of the one user in the set of users; modifying the computed random number assignment seed value to produce a modified random number assignment seed value, the modifying including dividing the computed random number assignment seed value by A1, wherein A1 is equal to a quantity of unassigned numbers in the set of numbers that are currently available to be assigned to the one user in the set of users; rounding the modified random number assignment seed value down to an integer value closest to the modified random number assignment seed value, the integer value being equal to $A_2$; computing a random number assignment offset value by multiplying $A_1$ by $A_2$; computing a random number assignment lookup number by subtracting the random number assignment offset value from the computed random number assignment seed value; determining the random number to be assigned to the one user in the set of users from the set of numbers by using the computed random number assignment lookup number and a dynamic arrangement of the unassigned numbers in the set of numbers; and assigning the determined random number to the one user in the set of users.

Additional aspects of the present disclosure include a computer-implemented method for selecting a final user from a set of users. The method comprises assigning a random number from a set of numbers to each user in the set of users; arranging the users in the set of users based on the random number assigned to each of the users in the set of users; and selecting the final user from the set of users, the selecting including: selecting a letter from a name of each of the users in the set of users; computing a user selection seed value based at least on (i) an ASCII-value representation of the name of each user in the set of users and (ii) an ASCII-value representation of the selected letters from the names of the users in the set of users; modifying the computed user selection seed value to produce a modified user selection seed value, the modifying including dividing the computed user selection seed value by $B_1$, wherein $B_1$ is equal to the number of users in the set of users; rounding the modified user selection seed value down to an integer value closest to the modified user selection seed value, the integer value being equal to $B_2$; computing a user selection offset value by multiplying $B_1$ by $B_2$; computing a user selection lookup number by subtracting the user selection offset value from the computed user selection seed value; determining the final user by using the computed user selection lookup number and the arrangement of the users in the set of users; and selecting the final user.

Further aspects of the present disclosure include a method for selecting a letter from the name of one user in a set of users. The method comprises arranging the users in the set of users based on a date and time at which each of the users in the set of users were added to the set of users; computing a letter selection seed value based at least on a position of the one user in the set of users within the arrangement of the users in the set of users; modifying the computed letter selection seed value to produce a modified letter selection seed value, the modifying including dividing the computed letter selection seed value by $C_1$, wherein $C_1$ is equal to an amount of letters in a name of the one user in the set of users; rounding the modified letter selection seed value down to an integer value closest to the modified letter selection seed value, the integer value being equal to $C_2$; computing a letter selection offset value by multiplying $C_1$ by $C_2$; computing a letter selection lookup number by subtracting the letter selection offset value from the computed letter selection seed value; determining the letter to be selected from the name of the one user in the set of users by using the computed letter selection lookup number and the name of the one user in the set of users; and selecting the determined letter from the name of the one user in the set of users.

Still further aspects of the present disclosure include a method for selecting a final user from a set of users. The method comprises assigning a random number from a set of numbers to each user in the set of users; sorting the set of users into a first subset of users, a second subset of users, and a third subset of users, the sorting being based at least in part on a present value associated with each of the users in the set of users, a historical value associated with each of the users in the set of users, or both; dynamically arranging the users in the first subset of users based on the random number previously assigned to each of the users in the first subset of users; removing one or more of the users in the first subset of users, thereby forming a reduced first subset of users, the removing of one user in the first subset of users including: computing a first removal seed value that is specific to the one user in the first subset of users based at least on an ASCII-value representation of a name of each user currently remaining in the first subset of users; modifying the computed first removal seed value to produce a modified first removal seed value, the modifying including dividing the computed first removal seed value by $D_1$, wherein $D_1$ is equal to the number of users currently remaining in the first subset of users; rounding the modified first removal seed value down to an integer value closest to the modified first removal seed value, the integer value being equal to $D_2$; computing a first removal offset value by multiplying $D_1$ by $D_2$; computing a first removal lookup number by subtracting the first removal offset value from the computed first removal seed value; determining the one user in the first subset of users to be removed by using the computed first removal lookup number and the dynamic arrangement of the users in the first subset of users; and removing the determined one user in the first subset of users from the first subset of users.

The method further comprises combining the reduced first subset of users and the second subset of users to create a fourth subset of users; dynamically arranging the users in the fourth subset of users based on the random number previously assigned to each of the users in the fourth subset of users; removing one or more of the users in the fourth subset of users, thereby forming a reduced fourth subset of users, the removing of one user in the fourth subset of users including: computing a second removal seed value that is specific to the one user in the fourth subset of users based at least on an ASCII-value representation of a name of each user currently remaining in the fourth subset of users; modifying the computed second removal seed value to produce a modified second removal seed value, the modifying including dividing the computed second removal seed value by $E_1$, wherein $E_1$ is equal to the number of users currently remaining in fourth subset of users; rounding the modified second removal seed value down to an integer value closest to the modified second removal seed value, the integer value being equal to $E_2$; computing a second removal offset value by multiplying $E_1$ by $E_2$; computing a second removal lookup number by subtracting the second removal offset value from the computed second removal seed value; determining the one user in the fourth subset of users to be removed by using the computed second removal lookup number and the dynamic arrangement of the users in the fourth subset of users; and removing the determined one user in the fourth subset of users from the fourth subset of users.

The method further comprises combining the reduced fourth subset of users and the third subset of users to create a fifth subset of users; arranging the users in the fifth subset of users based on the random number previously assigned to each of the users in the fifth subset of users; and selecting the final user from the fifth subset of users.

Still additional aspects of the present disclosure include a computer-implemented method for sorting users in a set of users into a first subset of users, a second subset of users, and a third subset of users. The method comprises sorting, into the first subset of users, all users in the set of users that are associated with a historical value less than a first predetermined threshold historical value; sorting, into the second subset of users, all users in the set of users that are associated with a historical value greater than or equal to the first predetermined threshold historical value and less than a second predetermined threshold historical value; sorting, into the second subset of users, all users sorted into the first subset of users that are associated with a present value less than a first predetermined percentage of a maximum present value; sorting, into the third subset of users, all users sorted into the first subset of users that are associated with a present value greater than or equal to the first predetermined percentage of the maximum present value and less than a second predetermined percentage of the maximum present value; and sorting, into the third subset of users, all users sorted into the second subset of users that are associated with a present value greater than or equal to a third predetermined percentage of the maximum present value.

These and other capabilities of the invention, along with the invention itself, will be more fully understood after a review of the following figures, detailed description, and claims.

BRIEF DESCRIPTION OF THE DRAWINGS

The disclosure will be better understood from the following description of exemplary embodiments together with reference to the accompanying drawings.

Figure 1:
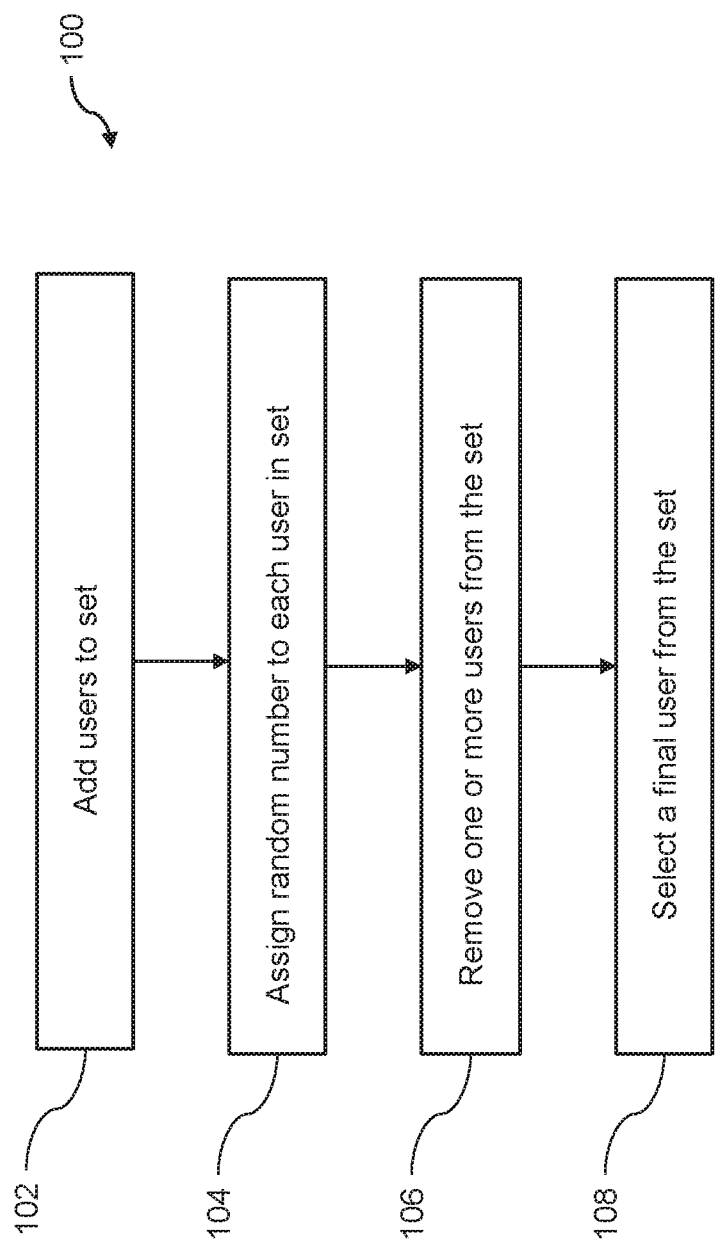
FIG. 1 illustrates an exemplary process for selecting a final user from a set of users, in accord with aspects of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments shown. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

Aspects of the present disclosure can be implemented using one or more suitable processing device, such as general purpose computer systems. microprocessors, digital signal processors, micro-controllers, application specific integrated circuits (ASIC), programmable logic devices (PLD), field programmable logic devices (FPLD), field programmable gate arrays (FPGA), mobile devices such as a mobile telephone or personal digital assistants (PDA), a local server, a remote server, wearable computers, tablet computers, or the like.

Memory storage devices of the one or more processing devices can include a machine-readable medium on which is stored one or more sets of instructions (e.g., software) embodying any one or more of the methodologies or functions described herein. The instructions can further be transmitted or received over a network via a network transmitter receiver. While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term "machine-readable medium" can accordingly be taken to include, but not be limited to, solid-state memories, optical media, and magnetic media. A variety of different types of memory storage devices, such as a random access memory (RAM) or a read only memory (ROM) in the system or a floppy disk, hard disk, CD ROM, DVD ROM, flash, or other computer readable medium that is read from and/or written to by a magnetic, optical, or other reading and/or writing system that is coupled to the processing device, can be used for the memory or memories.

Referring now to FIG. 1, a process 100 for selecting a final user from a set of users is shown. At step 102, a plurality of users is added to the set. The human name of each user is tracked, as well as the date and time at which the user was added to the set, and how many users had been previously added to the set when each user is added. At step 104, a random number is assigned to each user in the set. The random number assigned to each user is chosen from a set of numbers that generally ranges from 1 to the number of users in the set. For example, in a set containing 100 users, any single user could be randomly assigned a number that falls within the inclusive range of 1-100. In this embodiment, the quantity of random numbers in the set of numbers is equal to the number of users in the set. In another embodiment according to aspects of the present disclosure, the quantity of random numbers in the set of numbers is greater than the number of users in the set. Each user is assigned a single random number, leaving at least one number from the set that will remain unassigned. A further embodiment according to aspects of the present disclosure also includes a quantity of random numbers in the set of numbers greater than the number of users in the set. In this further embodiment, one or more users in the set of users is assigned multiple random numbers from the set of numbers.

At step 106 of the process 100, one or more users can be removed from the set. The removal of the one or more users can be based on pre-existing properties of the users, as well as the random number that has been assigned to each of the users. At step 108, a final user is selected from the set of users.

Figure 2:
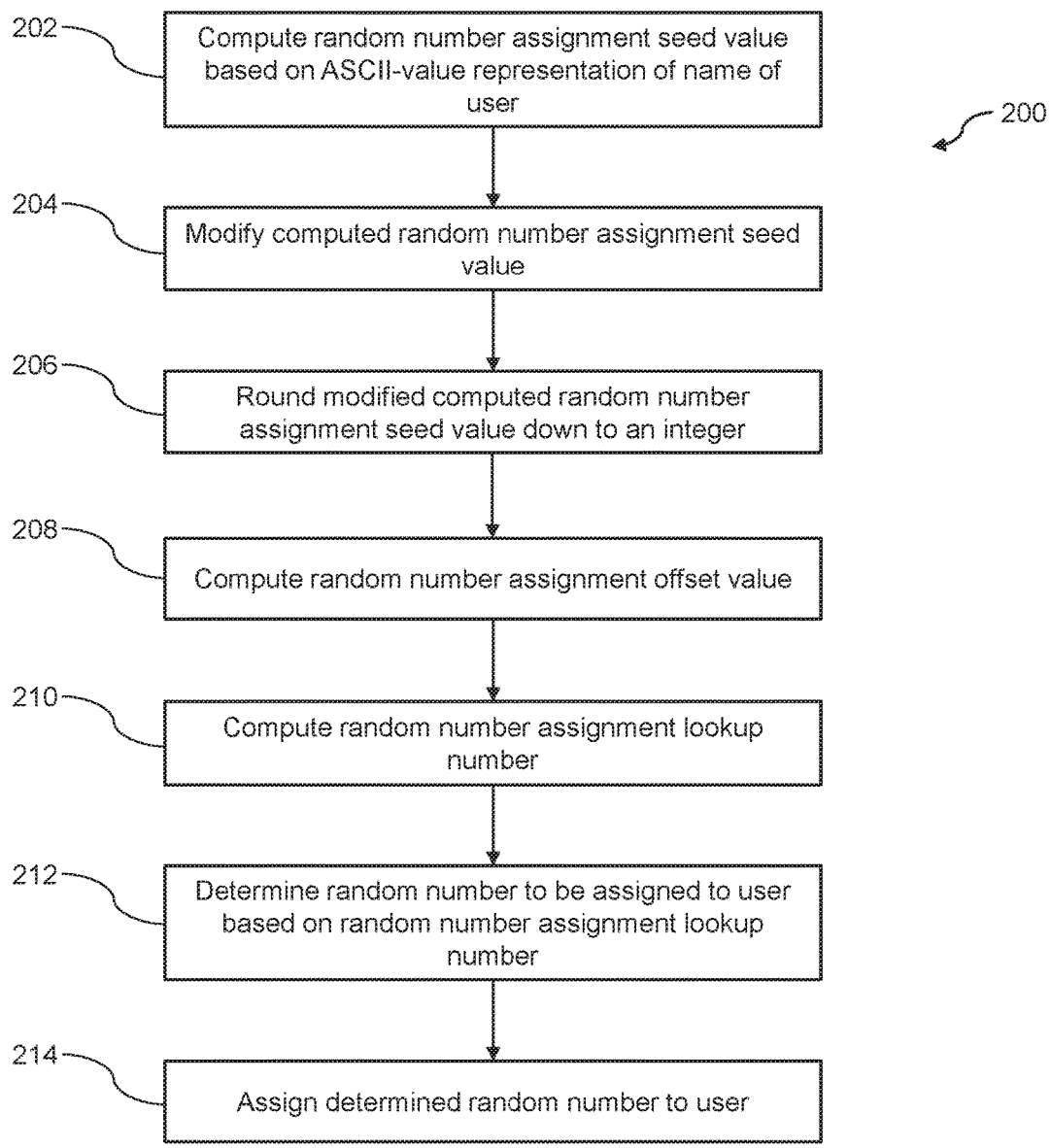
FIG. 2 illustrates an exemplary process for assigning a random number to each user in a set of users, in accord with aspects of the present disclosure.

Referring now to FIG. 2, a process 200 for assigning a random number to each user in a set of users is shown. The process 200 is an iterative process, in that steps 202 through 214 are performed for each user in the set of users until each user has been assigned the desired quantity of random numbers. FIG. 2 illustrates how a random number is assigned to one user in the set of users. At step 202, a random number assignment seed value is computed for the one user. The random number assignment seed value is specific to the one user. The random number assignment seed value can be based on an ASCII-value representation of the user's human name, the date and time at which the one user was added to the set of users, the number of users that were previously added to the set of users by the date and time the one user was added to the set (i.e. a number of "already-existing" users), as well as a sum of all unassigned numbers in the set of numbers that are currently available to be assigned to the one user. These quantities can be added together to produce the random number assignment seed value. In an embodiment, each quantity is added to produce the random number assignment seed value. In another embodiment, only some of these quantities are added together to produce the random number assignment seed value. For example, the random number assignment seed value can simply be the ASCII-value representation of the one user's name, or can be the sum of the ASCII-value representation of the one user's name and the date and time at which the user was added to the set. A human name is not a set of words that the user typically has control over or assigned to him or herself. The user's parents assigned the human name, which is what makes the ASCII-value representation of the user's human name a particularly useful seed value because it is a value that the user did not have control over. This prevents manipulation of the seed value, which plagues other conventional techniques, by utilizing a fixed attribute of the user that the user did not assign. The name can be the first name, the last name, the middle name(s), or any combination of the first name, middle name(s), and last name. Utilizing, for example, the first and last name reduces the chances that in any given set, two users will have the same name.

Figure 3:
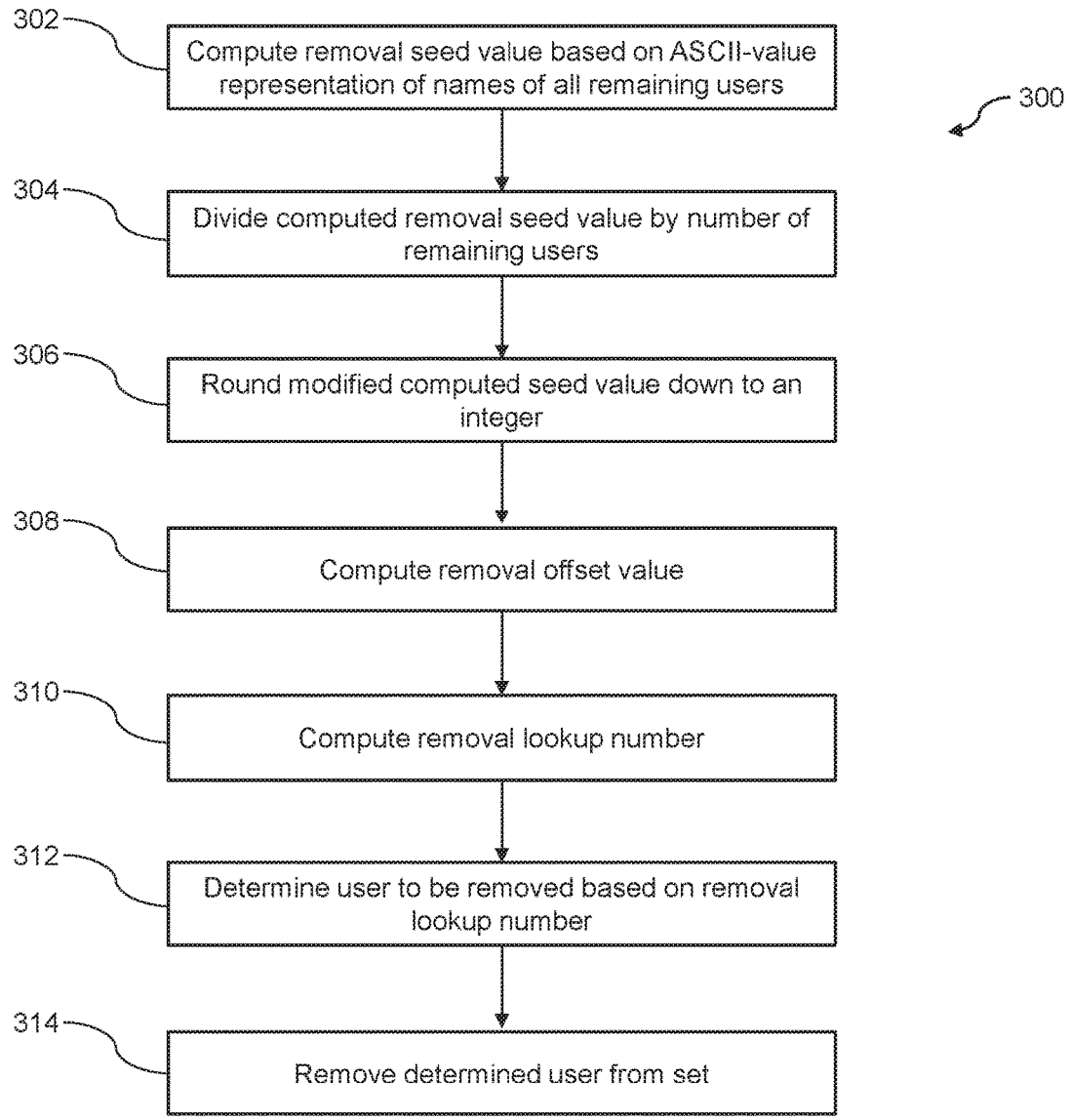
FIG. 3 illustrates an exemplary process for removing one or more users from a set of users, in accord with aspects of the present disclosure.

The ASCII-value representation of the one user's name is determined based on the American Standard Code for Information Interchange, or ASCII, which is a character encoding standard. This standard assigns a number to each of a variety of symbols. For example, uppercase letters A-Z are assigned a number in the range of 65 through 90. Lowercase letters are assigned a number in the range of 97 through 122. ASCII also assigns codes to a variety of different symbols, as well as numbers 0-9. A full ASCII table is shown in FIG. 3. To determine the ASCII-value representation of the one user, the individual ASCII codes for each letter of the one user's name are added together, with the first letter designated as being uppercase. For example, if the user's name is John, the ASCII-value representation of the user's name is determined by adding the ASCII code for J (74), o (111), h (104), and n (110), which equals 399. The use of an ASCII table allows for a wide variety of user names. Further, the use of the ASCII-value representation of the user's name provides for increased randomness in the process of assigning the random number to the one user. Because the users' names are unknown prior to the users being added to the set, and because the users' names are not inherently deterministic, the assignment of the random number to the one user is truly random. This is in contrast to commonly-used pseudo-random number generators, which eventually repeat the sequence of numbers produced, and are thus not truly random.

The date and time at which the one user was added to the set is represented as a sum of all of the individual numbers in the date and time. For example, the random number assignment seed value for a user added to the set at 8:49:32 PM on Apr. 13, 2017 will include 2+0+4+9+3+2+0+4+1+3+2+0+1+7=38. The number of already-existing users in the set corresponds to how many users are in the set at the date and time at which the one user was added to the set. Finally, when assigning the random number to the one user, there can be a quantity of numbers from the set of numbers that have already been assigned to other users. The remaining numbers that are available to be assigned to the one user are summed together and can be a component of the random number assignment seed value. For example, if the numbers 1 through 10 are in the set of numbers, and 2 and 7 have already been assigned, the sum of all unassigned numbers currently available to be assigned to the one user will be 1+3+4+5+6+8+9+10=46.

At step 204, the computed random number seed value is modified by dividing the computed random seed value by the quantity of unassigned numbers in the set of numbers. In the example where the numbers 1 through 10 are in the set of numbers and the numbers 2 and 7 have been assigned, this value is equal to 8, as there are eight numbers that are currently available. This division thus produces a modified computed random number assignment seed value. The quantity of unassigned numbers in the set of numbers can also be expressed as the quantity of users in the set of users that have not yet been assigned a random number from the set of numbers, or the number of users initially in the set minus the number of users in the set at the date and time at which the one users was added to the set. At step 206, the modified computed random number assignment seed value is rounded down to the nearest integer value.

At step 208, a random number offset value is computed by multiplying (i) the quantity of unassigned numbers that are currently available to be assigned to the user by (ii) the integer value of the rounded down modified computed random number assignment seed value. At step 210, a random number assignment lookup number is computed by subtracting the random number offset value from the computed random number assignment seed value. At step 212, the random number to be assigned to the one user is determined based on the random number assignment lookup number and a dynamic arrangement of the set of numbers to be assigned to the users in the set. The random number assignment lookup number corresponds to a location within the dynamic arrangement of the set of numbers. The arrangement of the set of numbers to be assigned to users in the set is dynamic because after each iteration of the process 200 where a number is assigned, the arrangement of the numbers is updated. Initially, the numbers in the set of numbers are placed in an arrangement. The numbers can be arranged in ascending order, descending order, or any other suitable order. The user is assigned the number that is located at a position within the dynamic arrangement that is equal to the random number assignment lookup value. For example, if the numbers 1 through 10 are arranged in ascending order and the random number assignment lookup value is 3, the user will be assigned the number 3, as 3 is in the third position within the arrangement. As the arrangement of numbers is dynamic, after the number has been assigned, the numbers are re-ordered such that numbers 4 through 10 are moved up to positions 3 through 9 in the table. Thus, if the process 200 for the next user produces a random number assignment lookup number of 3, that user will assigned the number 4, as 4 is now in the third position within the dynamic arrangement of numbers. If the computed random number assignment lookup number is 0, this corresponds to the random number located at the last position within the dynamic arrangement of random numbers. Finally at step 214, the one user is assigned the determined random number. The process 200 is repeated for all users within the set of users until each user has been assigned a number from the set of numbers. The arrangement of numbers to be assigned is updated each time a user is assigned one of the numbers.

Referring now to FIG. 3, a process 300 for removing a user from the set of users is shown. The process 300 removes users from the set of users until the amount of users remaining in the set is less than a predetermined percentage of the initial amount of users in the set of users. Generally, this predetermined percentage is about 50%. The process 300 illustrates the process for removing a single user from the set, and can be repeated multiple times until an appropriate number of users have been removed from the set. At step 302, a removal seed value is computed based on an ASCII-value representation of the names of all users that are currently remaining in the set of users. Similar to before, the ASCII-values of each letter of each user's name are determined, taking into account capital letters. All ASCII-values for each letter in each user's name are then summed together as part of the removal seed value. The removal seed value is also based on the sum of the individual digits in the date and time at which a last-in-time user in the set of users was added to the set, the number of users that are currently remaining in the set, and a unique identifier assigned to each user when they were added to the set. In an embodiment, each of these values are added together to obtain the removal seed value. In other embodiments, different combinations of these values can be added together to obtain the removal seed value.

At step 304, the computed removal seed value is modified by dividing the computed removal seed value by the number of users currently remaining in the set of users. This thus takes into account previous removals of users, as the number of remaining users will decrease each time the process 300 is performed. This division produces a modified computed removal seed value. At step 306, the modified computed removal seed value is rounded down to the nearest integer value.

At step 308, a removal offset value is computed by multiplying (i) the number of user currently remaining in the set by (ii) the integer value of the rounded down modified computed removal seed value. At step 310, a removal lookup number is computed by subtracting the removal offset value from the computed removal seed value. At step 312, the user that is to be removed from the set of users is determined by using the removal offset value and a dynamic arrangement of the users in the set of users. The removal lookup number corresponds to the location of a user to be removed within an arrangement of the users. The users in the set of users are ordered in this arrangement based on the random number that was assigned to each user. The users can be arranged in ascending order, descending order, or any other suitable order based on the random number assigned to them. The user at the location within this arrangement that is equal to the removal lookup number is the user that is to be removed. For example, if the removal lookup number is equal to 5, the user at the fifth location is determined to be the user that is removed. If the computed removal lookup number is 0, this corresponds to the user located at the last position within the arrangement of users. At step 314, this user is removed from the set of users. The arrangement of the users is dynamic because after the user is removed, the arrangement of the users is updated similar to how the arrangement of the numbers available to be assigned was updated in the process 200. If an appropriate amount of users have not yet been removed, the process 300 is repeated at least once. If an appropriate amount of users has been removed, the process 300 is not repeated.

Figure 4:
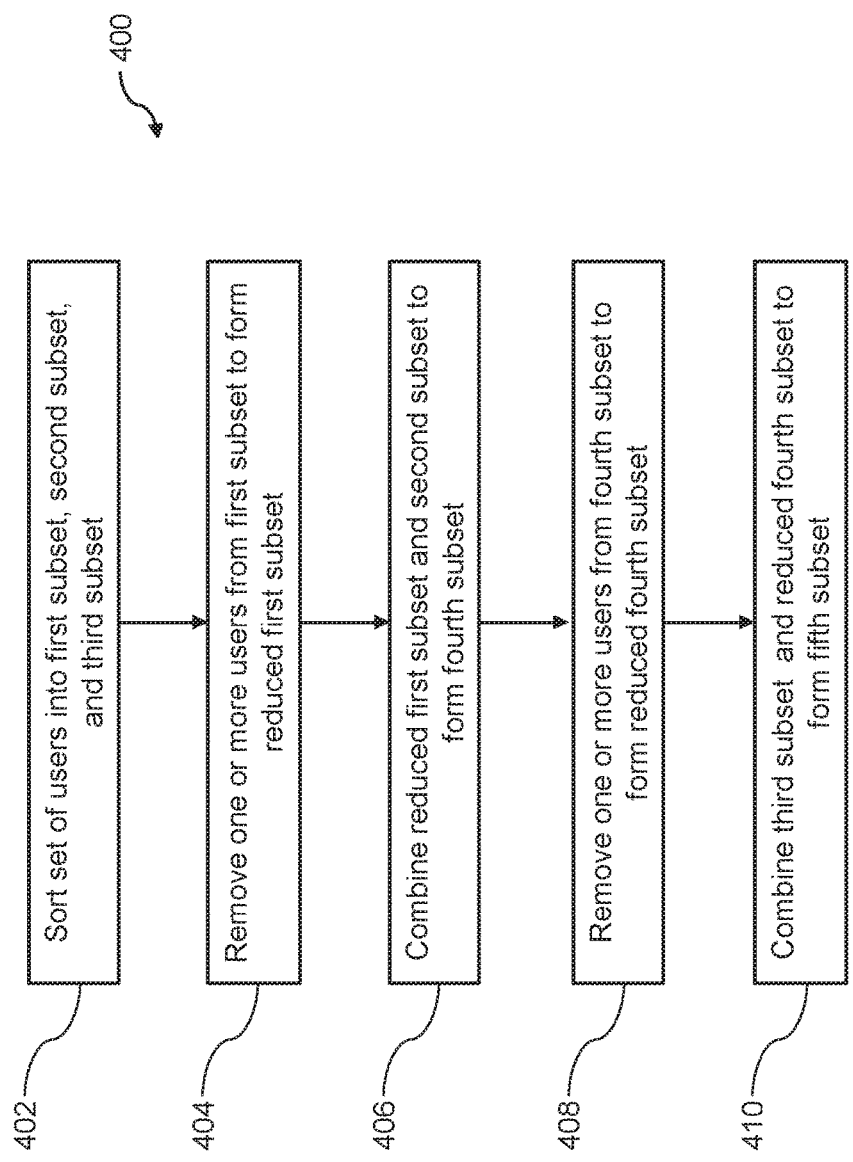
FIG. 4 illustrates a further exemplary process for removing one or more users from a set of users, in accord with aspects of the present disclosure.

Referring now to FIG. 4, a further process 400 for removing users from the set of users is shown. At step 402, the set of users is divided into a first subset of users, a second subset of users, and a third subset of users. At step 404, a reduced first subset is formed by removing one or more users from the first subset of users. These users can be removed from the first subset of users according to the steps of the process 300. Users are removed from the first subset until about 50% of the initial amount of users in the first subset remains in the first subset. At step 406, the reduced first subset of users is combined with the second subset of users to form the fourth subset of users. The fourth subset of users thus contains approximately 50% of the users initially placed into the first subset of users, and all of the users initially placed into the second subset of users. At step 408, a reduced fourth subset of users is formed by removing one or more users from the fourth subset of users. These users can be removed from the fourth subset of users according to the steps of the process 300. Users are removed from the fourth subset until about 50% of the initial amount of users in the fourth subset remains in the fourth subset. At step 410, the third subset is combined with the reduced fourth subset to form a fifth subset. The fifth subset thus contains all of the users initially placed into the third subset, and approximately 50% of the users in the fourth subset, which itself contained approximately 50 of the users initially placed into the first subset and all of the users placed into the second subset. As can be seen, a user of the third subset of users will have a higher chance of remaining in the set of users compared to a user of the second or third subset of users. In this way, users in the first, second, and third subsets enjoy a ranking relative to one another, allowing the implementer of the RNG process(es) disclosed herein to rank groups of users according to any desired criteria. While three subsets are disclosed herein, fewer or more than three subsets can be used.

Figure 5:
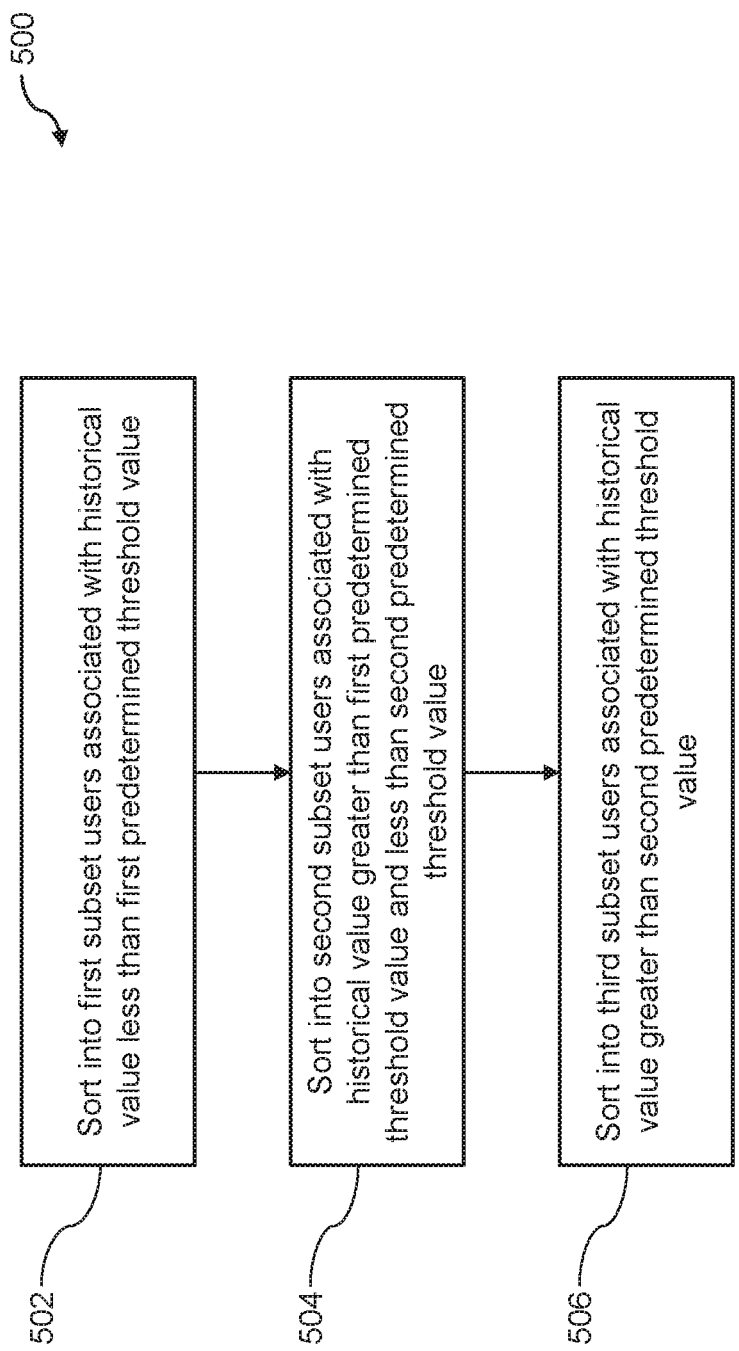
FIG. 5 illustrates an exemplary process for sorting users into a first subset of users, a second subset of users, and a third subset of users, in accord with aspects of the present disclosure.

Referring now to FIG. 5, a process 500 for sorting users into the first subset, the second subset, and the third subset is shown. Each user in the set of users can be associated with a historical value, which represents some historical component or property of the user. The historical value of the user generally can be derived from a historical record of user input that allows the user to participate in one or more the processes described herein. For example, to participate in the process 100 for selecting the final user from a set of users, all users generally must give some user input. A user's historical record of user input that they have given to participate in all such processes 100 to select a final user is used to determine the user's historical value for their participation in the current process 100 to select a final user. Thus, the process 500 takes into account the historical record of the users' user input, which is non-deterministic and not tied to any initial values of variables or initial conditions, thus increasing the overall randomness. At step 502, all users associated with a historical value that is less than a first predetermined threshold historical value are placed into the first subset. At step 504, all users associated with a historical value that is greater than the first predetermined threshold historical value but less than a second predetermined threshold historical value are placed into the second subset. At step 506, all users associated with a historical value that is greater than the second predetermined threshold historical value are placed into the third subset. These subsets can then be utilized as described in reference to FIG. 4.

Figure 6:
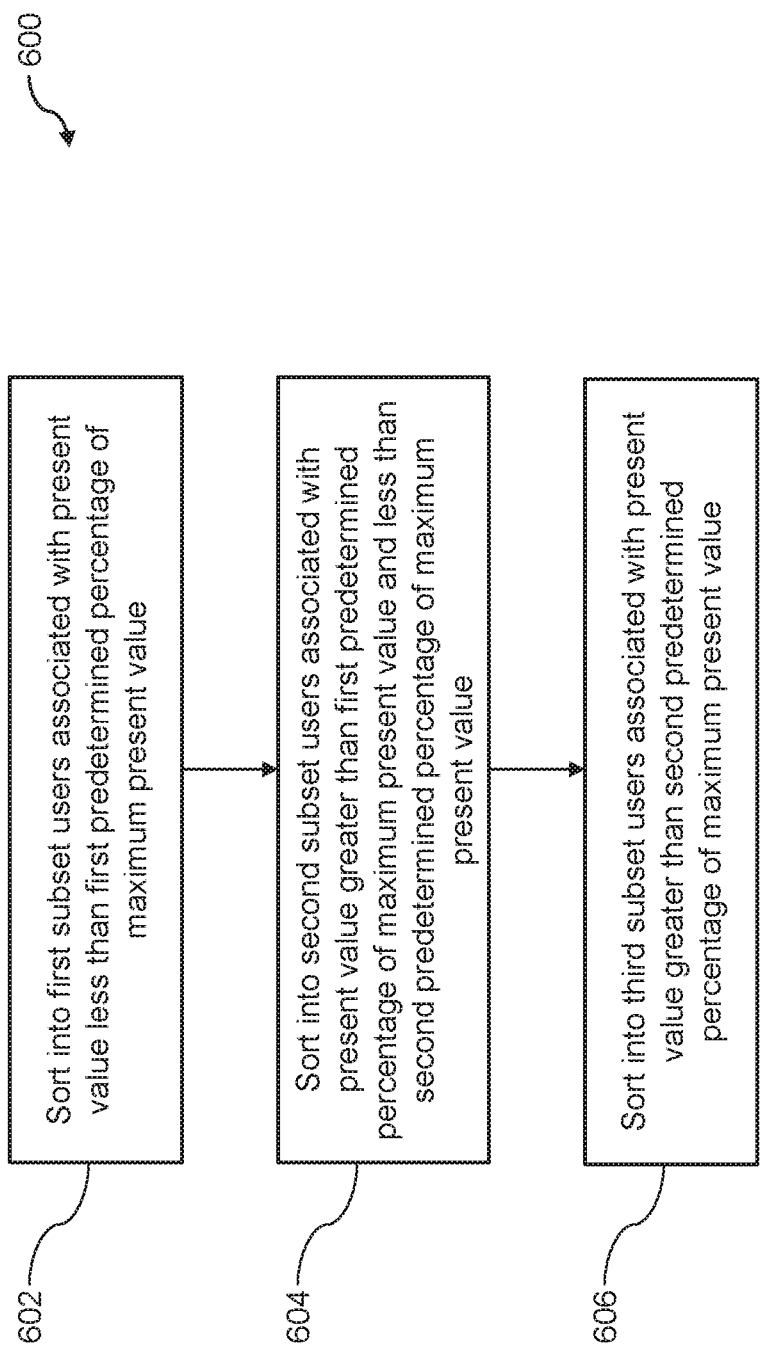
FIG. 6 illustrates a further exemplary process for sorting users into a first subset of users, a second subset of users, and a third subset of users, in accord with aspects of the present disclosure.

Referring now to FIG. 6, a process 600 for sorting users into the first subset, the second subset, and the third subset is shown. Each user in the set of users can be associated with a present or current value, which represents some present or current component or property of the user. The present value is based on the user input that each user gave to participate in the current process 100 to select a final user. Thus, similar to the historical value utilized in the process 500, the process 600 takes into account the user input given by the user's to participate in the current process 100, which is also non-deterministic and not tied to any initial values of variables or initial conditions, increasing the overall randomness. Generally, there is a maximum present value that any single user in the set of users can be associated with. At step 602, all users associated with a present value that is less than a first predetermined percentage of the maximum present value are placed into the first subset. At step 604, all users associated with a present value that is greater than the first predetermined percentage of the maximum present value but less than a second predetermined percentage of the maximum present value are placed into the second subset. At step 606, all users associated with a present value that is greater than the second predetermined percentage of the maximum present value are placed into the third subset. In an embodiment, the first predetermined percentage of the maximum present value is about 50%. In a further embodiment, the second predetermined percentage of the maximum present value is about 80%. Other values for the first and second predetermined percentage of the maximum present value are also contemplated. These subsets can then be utilized as described in reference to FIG. 4.

Figure 7:
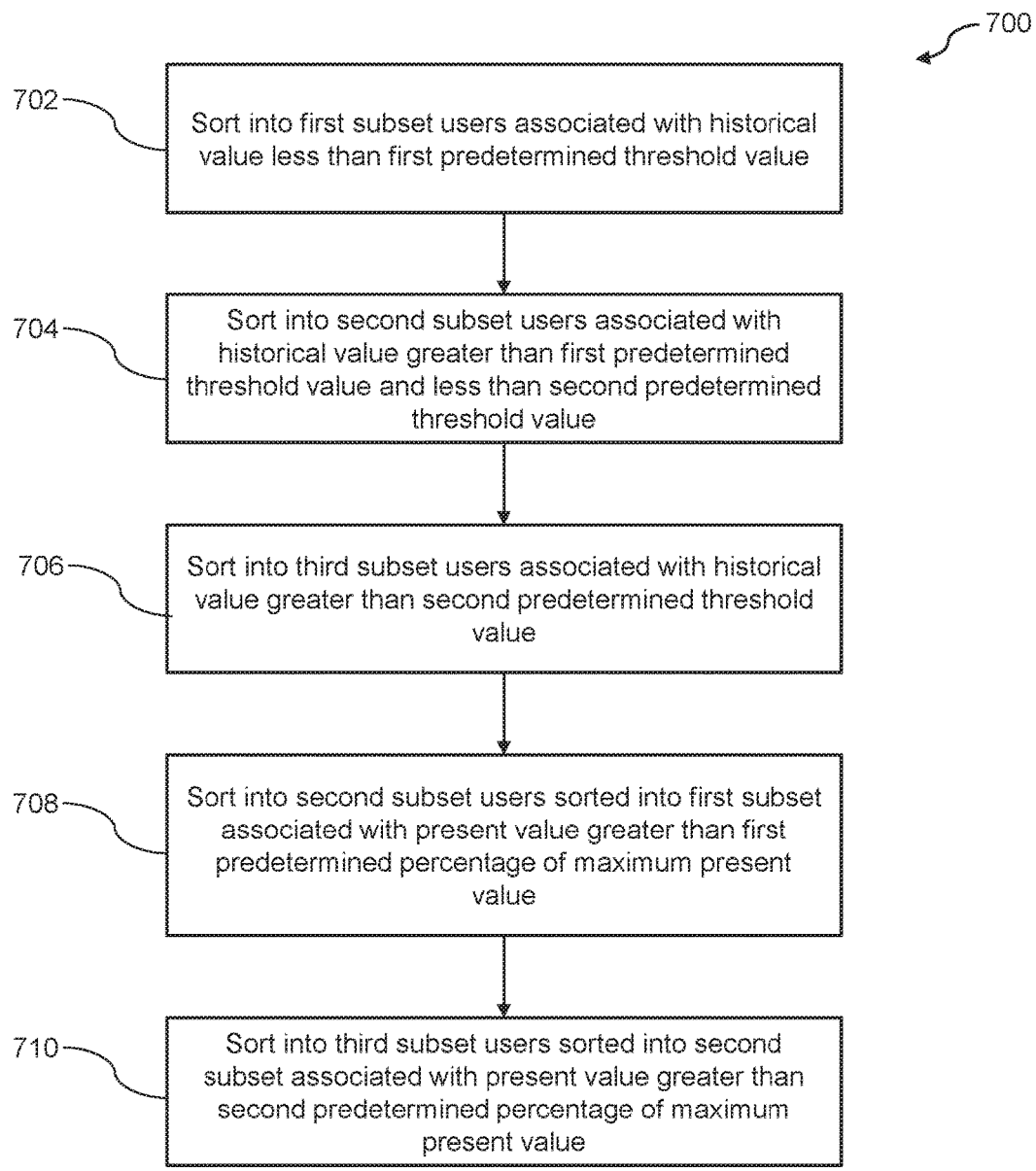
FIG. 7 illustrates yet a further exemplary process for sorting users into a first subset of users, a second subset of users, and a third subset of users, in accord with aspects of the present disclosure.

Referring now to FIG. 7, a process 700 for sorting users into the first subset, the second subset, and the third subset is shown. At step 702, all users associated with a historical value that is less than a first predetermined threshold historical value are placed into the first subset. At step 704, all users associated with a historical value that is greater than the first predetermined threshold historical value but less than a second predetermined threshold historical value are placed into the second subset. At step 706, all users associated with a historical value that is greater than the second predetermined threshold historical value are placed into the third subset. At step 708, users that were initially placed into the first subset that are associated with a present value that is greater than a first predetermined percentage of a maximum present value are removed from the first subset and placed into the second subset. At step 710, users in the second subset, either initially placed there at step 704 or subsequently placed there at step 706, that are associated with a present value that is greater than a second predetermined percentage of the maximum present value are placed into the third subset. In an embodiment of the process 700, the first predetermined percentage of the maximum present value can be about 50%. The second predetermined percentage of the maximum present value can be about 80%. These subsets can then be utilized as described in reference to FIG. 4.

Figure 8:
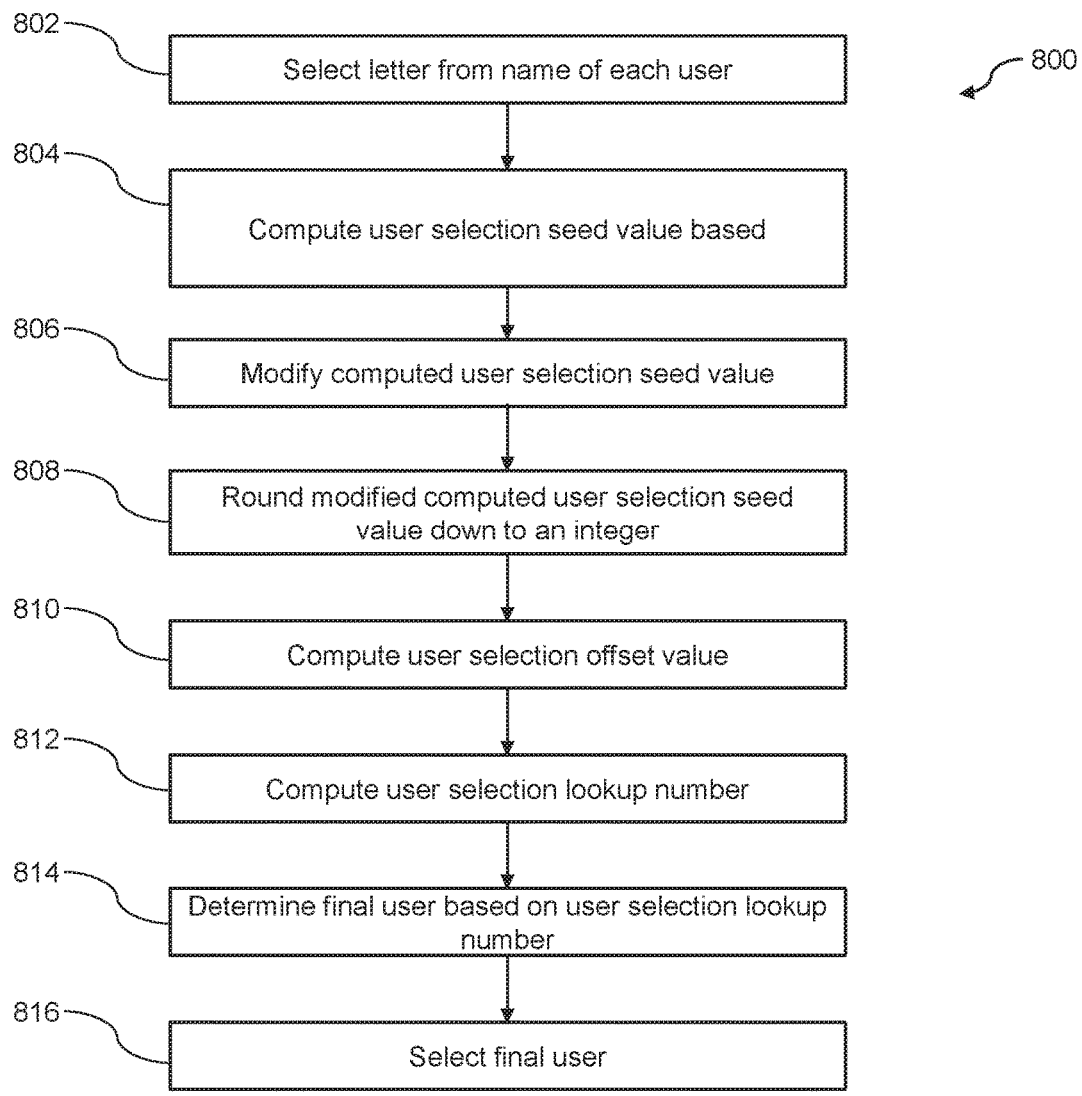
FIG. 8 illustrates a further exemplary process for selecting a final user from a set of users, in accord with aspects of the present disclosure.

Referring now to FIG. 8, a process 800 for selecting a final user is shown. In an embodiment, the final user is selected from the initial set of users. In another embodiment, the final user is selected from the initial set of users after one or more users have been removed from the set of users. In a further embodiment, the final user is selected from the fifth subset of users, after the initial set of users has been sorted into first, second, and third subsets of users, and one or more users have been removed from those subsets to form the fifth subset. Thus, while the description of the process 800 can refer to users in a set, this set can refer to any set of users that the final user is to be selected from. At step 802, a letter is selected from the name of each user in the set of users. At step 804, a user selection seed value is computed. The user selection seed value is based on the number of users in the set, a current date and time, an ASCII-value representation of the selected letters from names of the users, and an ASCII-value representation of the names of the users in the set. In an embodiment, the user selection seed value is the sum of each of these four values. In other embodiments, the user selection seed value is the sum of one or more of the values. The ASCII-value representation of the user's names is determined by converting each letter in the users' names to its ASCII-equivalents (taking into account capital letters) and adding together the individual ASCII-equivalents. The value for the current date and time is determined by adding the individual digits in the current date and time. The user selection seed value can also be based on a progressive number for each selection if a final user, which is a unique and non-repeating number or sequence of numbers generated each time a final user is selected from a set of users.

At step 806, the computed user selection seed value is modified by dividing the computed user selection seed value by the number of users in the set. This division produces a modified computed user selection seed value. At step 808, the modified computed user selection seed value is rounded down to the nearest integer value. At step 810, a user selection offset value is computed by multiplying (i) the number of users in the set by (ii) the integer value of the rounded down modified computed user selection seed value. At step 812, a user selection lookup number is computed by subtracting the computed user selection offset value from the computed user selection seed value. At step 814, the final user in the set of users is determined using the computed user selection lookup number and an arrangement of the users in the set. The computed user selection lookup number corresponds to the location of the final user within the arrangement of the users in the set. Generally, the users in this arrangement are ordered based on the random number that was assigned to each user. The users can be ordered in ascending order, descending order, or any other suitable order. If the computed user selection lookup number is 0, this corresponds to the user located at the last position within the arrangement of users. At step 816, the final user is selected from the set.

Figure 9:
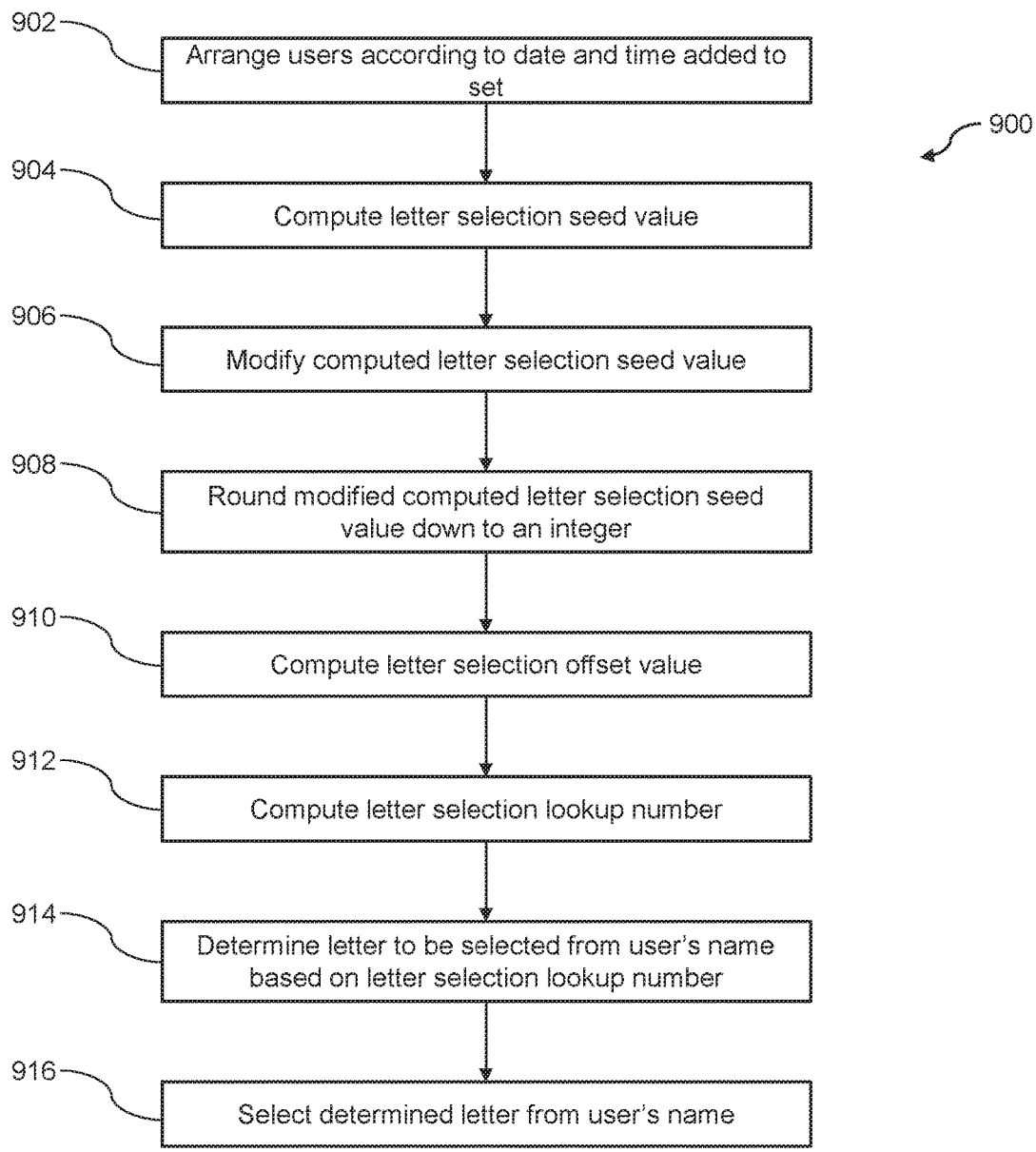
FIG. 9 illustrates an exemplary process for selecting a letter from the name of a user in a set of users, in accord with aspects of the present disclosure.

Referring now to FIG. 9, a process 900 for selecting a letter from the name of a user is shown. The process 900 thus details the steps that can be undergone in step 802 of the process 800. In an embodiment, the letters are selected from the names of users in the initial set of users. In another embodiment, the letters are selected from the names of users in the initial set of users after one or more users have been removed from the set of users. In a further embodiment, the letters are selected from the names of users in the fifth subset of users, after the initial set of users has been sorted into first, second, and third subsets of users and one or more users have been removed from those subsets to form the fifth subset. Thus, while the description of the process 900 can refer to users in a set, this set can refer to any set of users. The process 900 is repeated until a letter has been selected from the name of each user. The process 900 thus details the steps to select a letter from the name of one user in the set.

At step 902, the users in the set are arranged according to the date and time at which each of the users was added to the set. Generally, the very first user to be added to the set is placed at the first location within the arrangement of users, while the last user to be added to the set is placed at the last location within the arrangement of users. At step 904, a letter selection seed value is computed for the one user. The letter selection seed value is generally equal to the position of the one user within the arrangement of users.

At step 906, the computed letter selection seed value is modified by dividing the computed letter selection seed value by the amount of letters in the one user's name. This division produces a modified computed letter selection seed value. At step 908, the modified computed letter selection seed value is rounded down to the nearest integer value. At step 910, a letter selection offset value is computed by multiplying (i) the amount of letters in the one user's name by (ii) the integer value of the rounded down modified computed letter selection seed value. At step 912, a letter selection lookup number is computed by subtracting the computed letter selection offset value from the computed letter selection seed value. At step 914, the letter to be selected from the one user's name is determined based on the computed letter selection lookup number and the user's name. The computed letter selection lookup number corresponds to the position of the letter to be selected within the user's name. For example, if the user's name was "John" and the computed letter selection lookup number was three, the letter to be selected from John's name would be "h." If the computed letter selection lookup number is 0, this corresponds to the last letter of the one user's name. Finally at step 916, the determined letter is selected from the one user's name. The process 900 is repeated for each user in the set of users, until a letter has been selected from the name of each user in the set.

Figure 10:
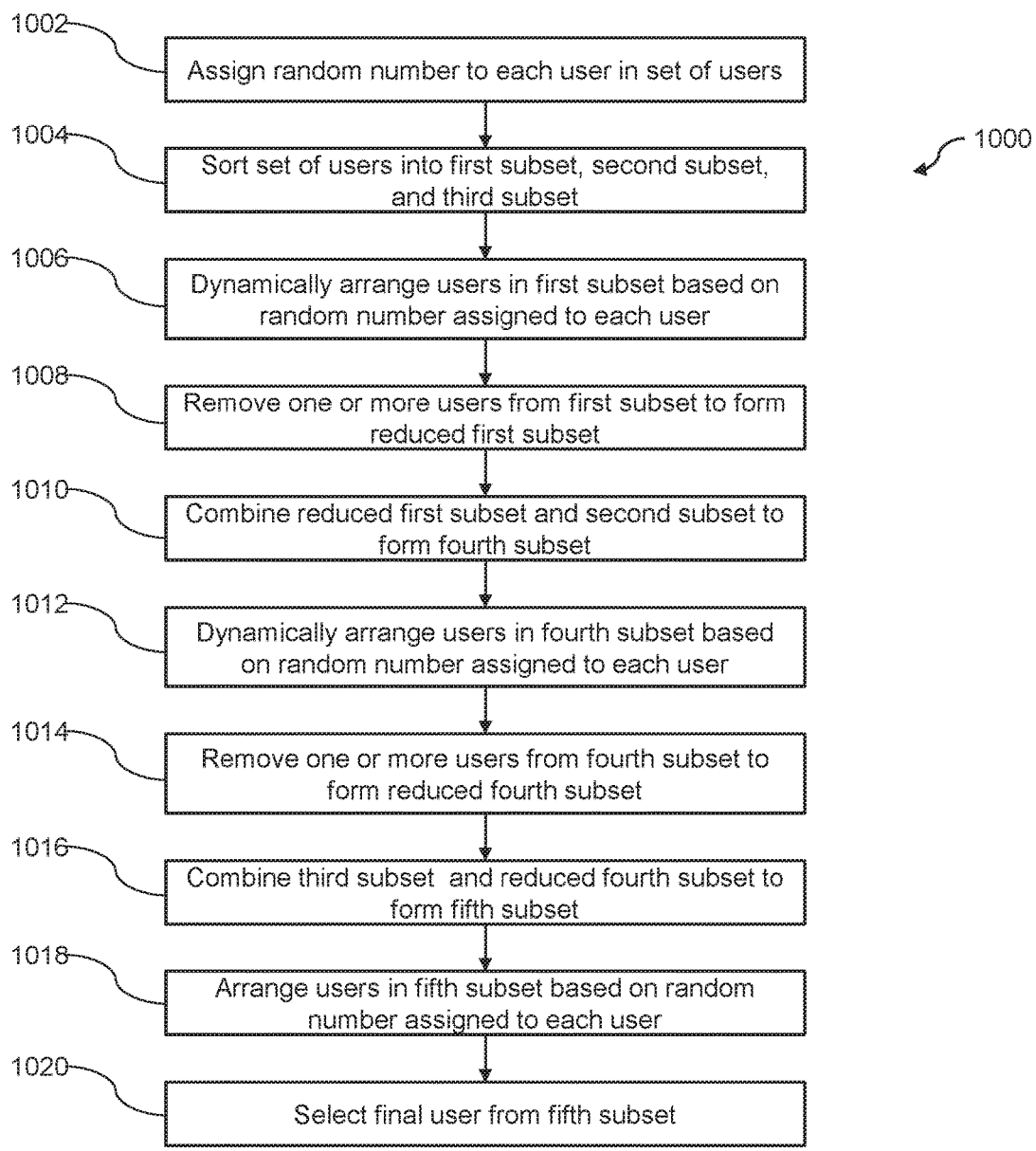
FIG. 10 illustrates yet a further exemplary process for selecting a final user from a set of users, in accord with aspects of the present disclosure.

Referring now to FIG. 10, a process 1000 for selecting a final user from a set of users is shown. At step 1002, a random number from a set of numbers is assigned to each user in a set of users. The random numbers can generally be assigned to each user in accordance with the process 200 shown and described in connection with FIG. 2 above. At step 1004, the users in the set of users are sorted into a first subset of users, a second subset of users, and a third subset of users. The users can be sorted into the subsets in accordance with the process 500 shown and described in connection with FIG. 5 above, the process 600 shown and described in connection with FIG. 6 above, the process 700 shown and described in connection with FIG. 7 above, or any other suitable process. At step 1006, the users in the first subset are dynamically arranged within the first subset based on the random number assigned to each user in the first subset. Generally, the users in the first subset will be arranged in an ascending order, such that the user with the lowest random number will be at the first position within the dynamic arrangement. Other arrangements are contemplated. At step 1008, one or more users are removed from the first subset to form a reduced first subset. The one or more users can be removed from the first subset in accordance with the process 300 shown and described in connection with FIG. 3 above. If more users must be removed from the first subset after any given user has been removed, the dynamic arrangement of users in the first subset is updated. Generally, users are removed from the first subset until the number of users remaining in the first subset is equal to a first predetermined percentage of the initial number of users in the first subset. In an embodiment, the first predetermined percentage is about 50%.

At step 1010, the reduced first subset is combined with the second subset to form a fourth subset. The fourth subset thus contains approximately 50% of the users initially placed into the first subset, and all of the users placed into the second subset. At step 1012, the users in the fourth subset are dynamically arranged within the fourth subset based on the random number assigned to each user in the fourth subset. Generally, the users in the fourth subset will be arranged in an ascending order, such that the user with the lowest random number will be at the first position within the dynamic arrangement. Other arrangements are contemplated. At step 1014, one or more users are removed from the fourth subset to form a reduced fourth subset. The one or more users can be removed from the fourth subset in accordance with the process 300 shown and described in connection with FIG. 3 above. If more users must be removed from the fourth subset after any given user has been removed, the dynamic arrangement of users in the fourth subset is updated. Generally, users are removed from the fourth subset until a number of users remaining in the fourth subset is equal to a second predetermined percentage of the initial number of users in the fourth subset. In an embodiment, the second predetermined percentage is about 50%.

At step 1016, the third subset is combined with the reduced fourth subset to from a fifth subset. The fifth subset thus contains all of the users initially placed into the third subset, and approximately 50% of the users in the fourth subset, which itself contained approximately 50% of the user placed into the first subset and all of the users placed into the second subset. At step 1018, the users in the fifth subset of users are arranged based on the random number that was assigned to each user in the fifth subset. Finally a step 1020, a final user is selected from the fifth subset of users. The final user can be selected in accordance with the process 800 shown and described in connection with FIG. 8 above.

Figure 11:
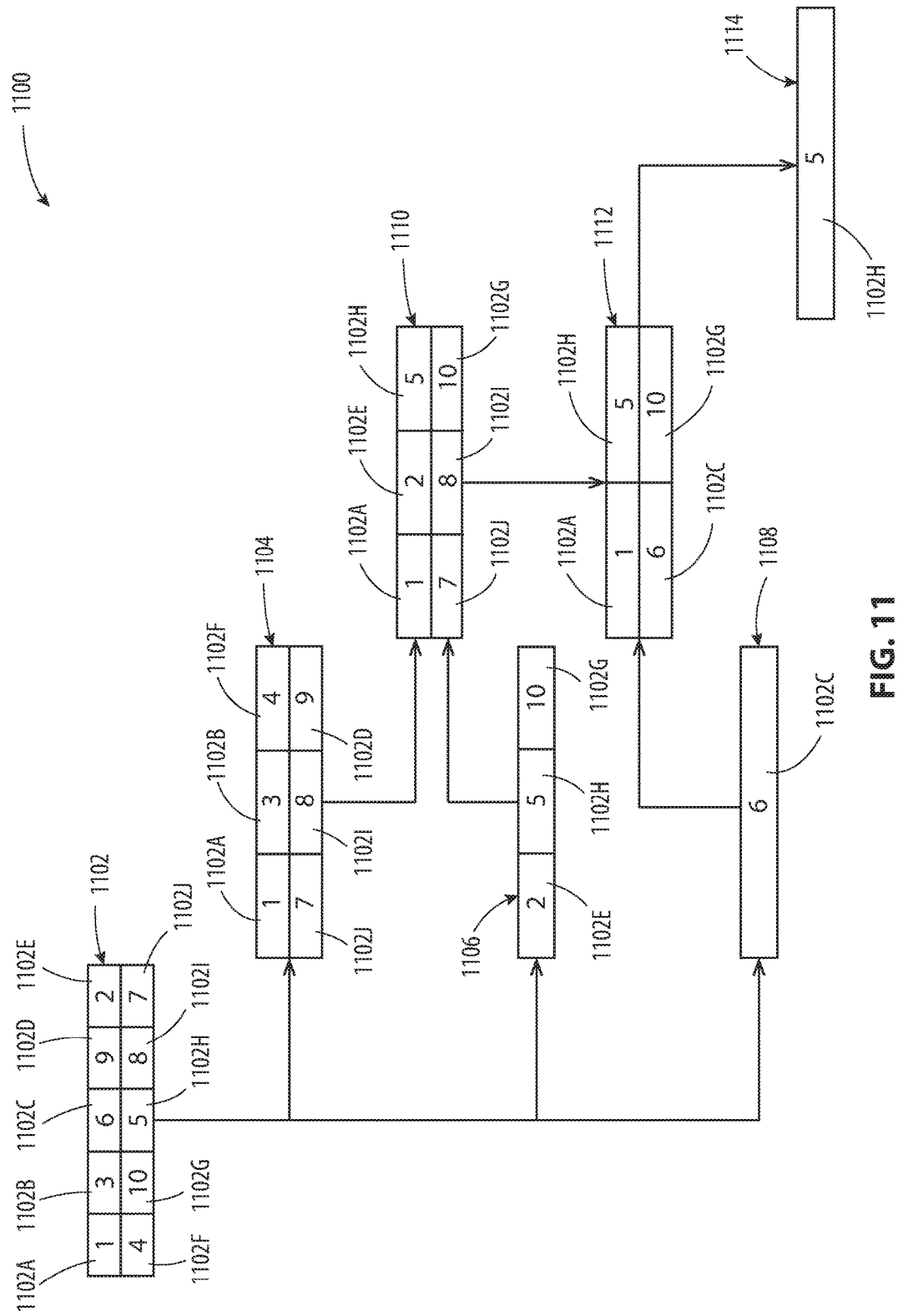
FIG. 11 illustrates an exemplary embodiment of the processes described herein for selecting a final user from an initial set of users, in accord with aspects of the present disclosure.

Referring now to FIG. 11, an exemplary embodiment 1100 of any of the processes described herein is shown. The number of users in the example set and subsets described in connection with FIG. 11 are purely arbitrary for ease of illustration and discussion. An initial set 1102 of users contains ten users 1102A-1102J. Each user 1102A-1102J is randomly assigned a number 1-10 using any ASCII-seeded approach described above. In the exemplary embodiment 1100, the set of numbers to be assigned to the users includes the number values 1-10. In another embodiment, the set of numbers can include ten numbers, one or more of which are outside the range 1-10. As shown, the users 1102A-1102J are sorted into first subset 1104, second subset 1106, and third subset 1108. The users 1102A-1102J can be sorted according to a present value associated with each user, a historical value associated with each user, or both a present value and a historical value associated with each user. Generally, users with a higher present value and/or historical value are more likely to be placed into higher subsets, thus increasing the probability that those users will be selected as the final users. As shown in embodiment 1100, six users 1102A, 1102B, 1102F, 1102J, 1102I, and 1102D are placed into the first subset 1104. Three users 1102E, 1102H, and 1102G are placed into the second subset 1106. One user 1102C is placed into the third subset 1108. When or as users from the initial set 1102 are placed into the first subset 1104, the second subset 1106, and the third subset 1108, the users are dynamically arranged according to the random number assigned to each user. Thus as shown, the users in the first subset 1104, the second subset 1106, and the third subset 1108 are no longer arranged in order from 1102A to 1102J, but rather in ascending order according to their respective number assignment with the user having the lowest assigned number within each subset arranged first in each corresponding subset 1104, 1106, 1108.

A number of users in the first subset 1104 are removed until the number of users remaining in the first subset 1104 is equal to a first predetermined percentage of the initial users in the first subset 1104. In the exemplary embodiment 1100, the first predetermined percentage is 50%. Thus, three of six users that were placed into the first subset 1104 are removed from the first subset 1104. The three remaining users 1102A, 1102J, and 1102I in the first subset 1104 are then placed into a fourth subset 1110. Additionally, all of the users that were initially placed into the second subset 1106 are placed into the fourth subset 1110 with the remaining users from the first subset 1104. Thus, in exemplary embodiment 1100, the fourth subset 1110 contains users 1102A, 1102J, and 1102I from the first subset 1104, and users 1102E, 1102H, and 1102G from the second subset 1106. The users in the fourth subset 1110 are dynamically arranged according to the random number assigned to each of the users, as shown.

A number of users in the fourth subset 1110 are removed until the number of users remaining in the fourth subset 1110 is equal to a second predetermined percentage of the initial users in the fourth subset 1110. In the exemplary embodiment 1100, the second predetermined percentage is 50%. Thus, three of the six users in the fourth subset 1110 are removed from the fourth subset 1110. The remaining three users 1102A, 1102H, and 1102G are placed into fifth subset 1112. User 1102A was initially placed into the first subset 1104 based on at least one of user 1102A's present value and historical value. Users 1102H and 1102G were initially placed into the second subset 1106 based on at least their present value and historical value. Finally, the users from the third subset 1108 are placed into the fifth subset 1112. In the exemplary embodiment 1100, a single user 1102C was initially sorted into the third subset 1108, and is placed into the fifth subset 1112. The users in the fifth subset 1112 are dynamically arranged according to the random number assigned to each of the users, as shown. A final user 1114 is selected from the fifth subset 1112. In the exemplary embodiment 1100, user 1102H is selected as the final user 1114.

A variety of different processes are disclosed involving different sets of users. Generally, different processes operate the same way on different sets of users. For example, random numbers can be assigned to each user in a set, whether the set is the initial set of users, the first subset of users, the second subset of users, the third subset of users, the reduced first subset of users, the fourth subset of users, the reduced fourth subset of users, the fifth subset of users, or any other set of users. Users can be removed from any set of users, whether the set is the initial set of users, the first subset of users, the second subset of users, the third subset of users, the reduced first subset of users, the fourth subset of users, the reduced fourth subset of users, the fifth subset of users, or any other set of users. A final user can be selected from the users in any set of users, whether the set is the initial set of users, the first subset of users, the second subset of users, the third subset of users, the reduced first subset of users, the fourth subset of users, the reduced fourth subset of users, the fifth subset of users, or any other set of users. Moreover, while the principles described herein are referenced in connection with users in a set, these principles are applicable to other scenarios in which random numbers need to be generated and assigned to entities or objects.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A computer-implemented method of assigning a random number from a set of numbers to one user in a set of users, the method comprising:

computing a random number assignment seed value that is specific to the one user in the set of users based at least on an ASCII-value representation of a name of the one user in the set of users, the computing the random number assignment seed value including retrieving by a computer system the ASCII-value representation from an ASCII table;

modifying by the computer system the computed random number assignment seed value to produce a modified random number assignment seed value, the modifying including dividing the computed random number assignment seed value by $A_1$, wherein $A_1$ is a quantity of unassigned numbers in the set of numbers that are currently available to be assigned to the one user in the set of users;

rounding the modified random number assignment seed value down to an integer value closest to the modified random number assignment seed value, the integer value being equal to $A_2$;

computing a random number assignment offset value by multiplying $A_1$ by $A_2$;

computing a random number assignment lookup number by subtracting the random number assignment offset value from the computed random number assignment seed value;

determining by the computer system the random number to be assigned to the one user in the set of users from the set of numbers by using the computed random number assignment lookup number and a dynamic arrangement of the unassigned numbers in the set of numbers;

assigning by the computer system the determined random number to the one user in the set of users;

storing in a memory device of the computer system an association between the determined random number and the one user in the set of users; and using the association in a computer-implemented application running on one or more processors of the computer system to increase an accuracy or authenticity of the computer-implemented application.

2. The computer-implemented method of claim 1, wherein the computed random number assignment seed value is further based on (i) a date and time at which the one user in the set of users was added to the set of users, (ii) a number of users previously added to the set of users at the date and time at which the one user in the set of users was added to the set of users, and (iii) a sum of all unassigned numbers in the set of numbers that are currently available to be assigned to the one user in the set of users.

3. The computer-implemented method of claim 1, wherein the computed random number assignment lookup number corresponds to a location of the random number to be assigned within the dynamic arrangement of the unassigned numbers in the set of numbers.

4. The computer-implemented method of claim 1, wherein the ASCII-value representation of the name of the one user in the set of users is determined by taking a sum of an ASCII-value equivalent of each letter in the name of the one user in the set of users.

* * * * *